United States Patent [19]

Nomura et al.

[11] Patent Number: 5,126,905
[45] Date of Patent: Jun. 30, 1992

[54] HEAD POSITIONING APPARATUS

[75] Inventors: Hironori Nomura; Masao Morimoto, both of Chichibu; Hitoshi Kurihara, Yorii, all of Japan

[73] Assignee: Canon Denshi Kabushiki Kaisha, Chichibu, Japan

[21] Appl. No.: 551,474

[22] Filed: Jul. 12, 1990

[30] Foreign Application Priority Data

Jul. 31, 1989 [JP] Japan .................. 1-198616

[51] Int. Cl.⁵ ............................. G11B 21/02
[52] U.S. Cl. .................... 360/105; 360/106; 360/109
[58] Field of Search ............... 360/106, 105, 104, 109, 360/98.01

[56] References Cited

U.S. PATENT DOCUMENTS

| | | | |
|---|---|---|---|
| 4,720,756 | 1/1988 | Kohl et al. | 360/106 |
| 4,745,503 | 5/1988 | Muraoka et al. | 360/106 |
| 4,752,849 | 6/1988 | Yoshida et al. | 360/106 |
| 4,823,336 | 4/1989 | Inada et al. | 360/106 X |
| 4,853,808 | 8/1989 | Lutz | 360/98.01 |
| 5,012,372 | 4/1991 | Isomura et al. | 360/105 X |

*Primary Examiner*—John H. Wolff
*Attorney, Agent, or Firm*—Spencer, Frank & Schneider

[57] ABSTRACT

In a data writing and/or reading device in which data is written and/or read out from a rotating recording medium, a head carriage upon which one or more heads are mounted is guided by first and second guide rods to move in a predetermined direction with respect to the recording medium. A member for biasing the head carriage in the direction opposite the direction of a rotating force produced by the friction between the head or heads and the recording medium is provided. This force in the direction of rotation of the recording medium is counteracted so that deviation of the head in the direction of rotation of the recording medium is eliminated.

15 Claims, 4 Drawing Sheets

HEAD POSITIONING APPARATUS

BACKGROUND OF THE INVENTION

1. FIELD OF THE INVENTION

The present invention relates to a writing and/or reading apparatus of the type in which a writing head and/or reading head is displaced to a desired track position of a plurality of tracks defined on the surfaces of a disc-shaped recording medium and the desired data is written to and/or read out of the surfaces of the recording medium.

2. DESCRIPTION OF THE PRIOR ART

Conventionally, as in the data writing and/or reading apparatuses of the type described above, a floppy disc drive (to be referred to "FDD" in this specification hereinafter) is used as external storage for a computer. The desired data is written to and/or read out of the surfaces of a so-called flexible floppy disc.

In the case of FDD of the type described above, a head carriage upon which are mounted the one or more heads is supported that it can move freely in the direction in which a plurality of recording tracks are defined on one or both of the surfaces of the recording medium. Therefore, the heads can be moved to the desired recording tracks so that the desired data can be written and/or read out. And there have been proposed various guide means for guiding head carriages.

However, in the case of the apparatus (such as an FDD) of the type in which heads are made in contact the surfaces of the recording medium (such as a floppy disc) which is turning, thereby writing and/or reading the data, because of frictional force produced by frictional contact between the head or heads and the surface of the recording medium, the following problems arise.

Firstly, at the point of contact with the disc, the head is forced in a direction perpendicular to the radial direction in which the head is displaced so that the head and the head carriage carrying the head are forced in the direction of disc rotation resulting in tracking error. Secondly, conditions of the engagement between the head carriage and guide means are adversely affected so that the head carriage is forced to vibrate or oscillate, also resulting in tracking error. Consequently, a high-quality writing and/or reading operation cannot be carried out.

SUMMARY OF THE INVENTION

In view of the above, the primary object of the present invention is to provide a writing and/or reading apparatus capable of satisfactorily writing and/or reading with a high degree of quality without causing tracking error.

In the first aspect of the present invention, a writing and/or reading apparatus of the type in which at least one head is made to contact a surface of a rotating recording medium comprises:

a head carriage upon which the at least one head is mounted and which is movable in a predetermined direction with respect to the recording medium; and means for biasing the head carriage in the direction opposite the direction of a rotating force produced by friction between the head and the recording medium.

Here, the head carriage may be guided by first and second parallel guide rods, and the force may be a rotating force produced by the friction between the head and the recording medium.

The second guide rod may be disposed substantially in the radial direction of the turning recording medium; and a plane which intersects the axes of the first and second guide rods may be parallel with rotating surfaces of the recording medium.

The head carriage may be movably supported at one point of the first guide rod through a pair of roller bearings and at two points of the second guide rod through two pairs of roller bearings, respectively.

The surfaces of contact of the pair of roller bearings may be inclined by predetermined angles, respectively, with respect to the plane passing through the axes of the first and second guide rods.

The angles may be equal to each other.

One of the pair of roller bearings may be elastically pressed against the first guide rod.

The biasing means further may comprise a roller bearing which is disposed in opposing relationship with a pair of roller bearings arranged closer to the heads on the second rod.

The further roll bearing may be rotatably supported by a swing arm which in turn is swingably disposed in the plane passing through the axes of the first and second guide rods on the head carriage.

In the second aspect of the present invention, a writing and/or reading apparatus comprises:

(a) means for driving a recording medium, (b) a pick-up means for writing or reading data to or out of the recording medium by contacting the recording medium, (c) positioning means for moving the pick-up means in a predetermined direction with respect to the recording medium so as to change writing or recording positions of the pick-up means, and (d) means for cancelling biased forces acting on the pick-up means which are caused by the contact between the pick-up means and the recording medium.

Here, the recording medium may be a disc and the driving means may have a spindle driven by a motor to rotate the disc.

The positioning means may support the pick-up means and moves the pick-up means in the radial direction of the disc.

The positioning means may have a carriage to which the pick-up means is attached, and the cancelling means may have an elastic member for biasing the carriage.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now referring to the accompanying drawings, a preferred embodiment of the present invention will be described.

Figure 3:
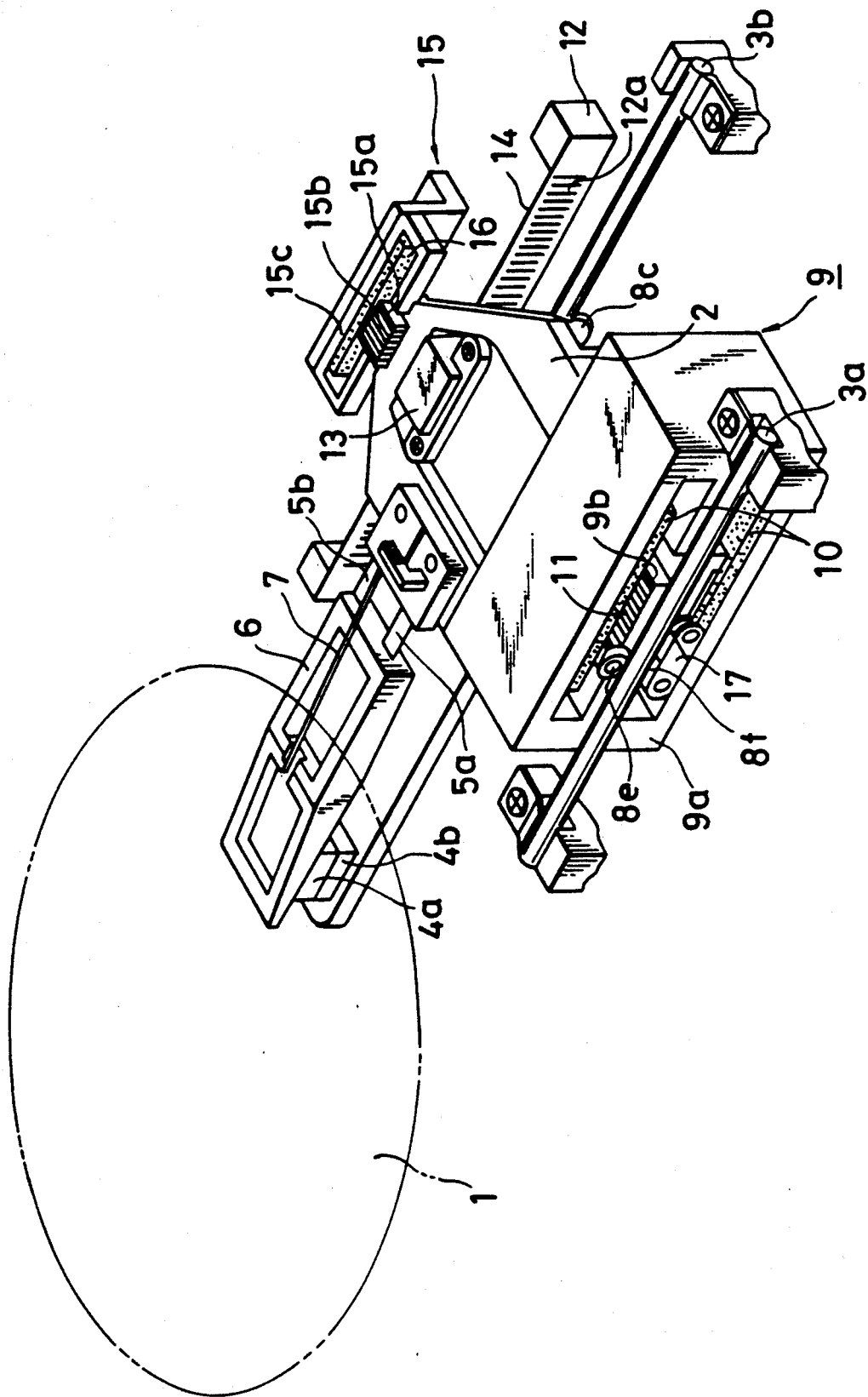
FIG. 3 is a perspective view showing a head displacement mechanism which is one of the most important components of the apparatus in accordance with the present invention.

Referring first to FIG. 3, reference numeral 1 represents a recording medium or a magnetic disc which is mounted on a spindle (not shown) and is turned at a predetermined rotational speed; 2, a head carriage which is guided by parallel guide rods 3a and 3b mounted on a chassis (not shown) to move in the radial direction of the magnetic disc 1.

Mounted on the head carriage 2 are an upper magnetic head 4a and a lower magnetic head 4b which are made into contact with the upper and lower surfaces, respectively, of the magnetic disc 1, thereby clamping or sandwiching the disc 1 therebetween. The lower magnetic head 4b is securely fixed to the head carriage 2 while the upper magnetic head 4a is securely fixed to a head arm 6 which in turn is vertically swingably supported by leaf springs 5a and 5b extended from the head carriage 2. In this case, the upper and lower magnetic heads 4a and 4b are disposed in opposing relationship with each other. The head arm 6 is normally biased under the force of a coiled spring 7 toward the lower magnetic head 4b. In other words, when the magnetic disc 1 is loaded into the apparatus, it is clamped between the upper and lower magnetic heads 4a and 4b. By a conventional mechanism (not shown), when the magnetic disc 1 is not loaded into the apparatus, the head arm 6 is upwardly spaced apart from the lower magnetic head 4. In response to the loadding the magnetic disc 1 or a head access command, the head arm 6 is controlled in such a way that the upper and lower magnetic heads 4a and 4b are made to contact with the surfaces of the magnetic disc 1. The exact details of this mechanism form no part of the present invention so that no further description shall be made in this specification.

Next referring to also FIG. 1 which shows the bottom of the head displacement mechanism shown in FIG. 3, a mechanism for guiding and driving the head carriage 2 will be described.

The head carriage 2 is guided by the guide rods 3a and 3b through a plurality of roller bearings 8a-8g in such a way that it can freely move in the lengthwise direction of the guide rods 3a and 3b. (The guide mechanism will be described in detail hereinafter.)

Reference numeral 9 represents a voice coil motor or driving source for moving the head carriage 2 along the guide rods 3a and 3b so that the magnetic heads 4a and 4b are brought to the proper tracks, respectively, of the magnetic disc 1. The voice coil motor 9 comprises a yoke 9a which is mounted on a chassis (not shown) and supports magnets 10 and a moving member 9b carrying a coil 11. The moving member 9b is made integral with the head carriage 2. It follows therefore that when the current flows through the coil 11 the magnetic field is established. By the coaction between the magnetic field thus established and the magnetic field established by the magnets 10, the moving member 9b is driven so that the head carriage 2 is displaced along the guide rods 3a and 3b. Then the heads 4a and 4b mounted on the head carriage 2 are displaced in the radial direction of the disc 1 to seek the desired tracks, respectively, thereby writing and/or reading the data to and/or out of the surfaces of the disc 1.

Reference numeral 12 represents a linear scale which is extended in parallel with the guide rods 3a and 3b in the range of displacement of the head carriage 2 and is securely mounted on the chassis (not shown). The linear scale 12 is formed with a plurality of slits 12a which are spaced apart from each other by the same distance in the direction of the movement of the head carriage 2. Mounted on the head carriage 2 in opposing relationship with the linear scale 12 is a sensor 13 such as a light interrupter consisting of a pair of light emitting and receiving elements in order to detect the displacement of the head carriage 2, thus constituting a linear encoder 14 of the head carriage 2.

Thus, the displacement of the head carriage 2 and hence the magnetic head 4a and 4b mounted thereon can be detected by receiving the light rays emitted from the light emitting element through the slits 12a and counting the number of slits 12a which have passed the light rays.

Referring still to FIG. 3, a velocity detector 15 for detecting the velocity of the head carriage 2 is disposed at the right end of the head carriage 2. The velocity detector 15 comprises a coil 15b mounted on a moving member 15a formed at the end of the head carriage 2 (or at a part of the voice coil motor) and a yoke 15c which extends through the coil 15b and carries a magnet 16. The yoke is securely mounted on the chassis (not shown). Therefore, the velocity of the head carriage 2 can be detected by detecting the current induced across the coil 15b when the coil 15b in unison with the head carriage 2 moves through the magnetic field established by the magnet 16.

Next, is described the head carriage guide mechanism which is one of the most important components of the data writing and/or reading apparatus in accordance with the present invention.

As described above, the head carriage 2 is guided by the first and second guide rods 3a and 3b, which are in parallel with each other, through the roller bearings 8a-8g. As shown best in FIG. 1, on the side of the second guide rod 3b the head carriage 2 is supported at two positions by a pair of the roller bearings 8a and 8b and by a pair of roller bearings 8c and 8d. As best shown in FIG. 2, one pair of roller bearings 8a and 8b (or 8c and 8d) are securely attached to the head carriage 2 in such a way that they are inclined by a predetermined angle $\theta$ (for instance, 45°) with respect to a plane 1 passing through the axes of the guide rods 3a and 3b above and below the plane 1. Engaging surfaces of the first and second guide rods, roller bearing (8a and 8b with the guide rod 3b) form a V so that the vertical and horizontal position of the head carriage 2 is determined.

As is clear from FIG. 2, a pair of roller bearings 8e and 8f are securely attached to the head carriage 2 in such a way that they are inclined by a predetermined angle $\theta$ at one position on the first guide rod 3a above and below the plane 1, respectively. A guide roller 8e on the side of the first guide rod 3a is rotatably supported on a swing arm 17 which in turn is swingably attached to the head carriage 2 and is pressed against the guide rod 3a as indicated by arrow A under the force of a coiled spring 18. Therefore, the head carriage 2 is positioned vertically by the force of the roller 8f and 8e which clamps the first guide rod 3a and is biased in the direction of the second guide rod 3b as indicated by an arrow A' so that the roller bearings 8a and 8b (8c and 8d) are pressed against the second guide rod 3b. Thus, the vertical and horizontal position of the head carriage 2 is determined by the V-shaped planes each of which is defined by a pair of the roller bearings.

With the above-described construction, the position of the head carriage 2 may be approximately determined, but this construction causes some problems as will be described hereinafter. That is in the so-called three point support constructed by the three pairs of bearing rollers 8a and 8b; 8c and 8d; and 8e and 8f, the roller 8e supported on the swing arm 17 is elastically pressed against the first guide rod 3a under the force of the coiled spring 18 so that the head carriage 2 is elastically supported.

Figure 1:
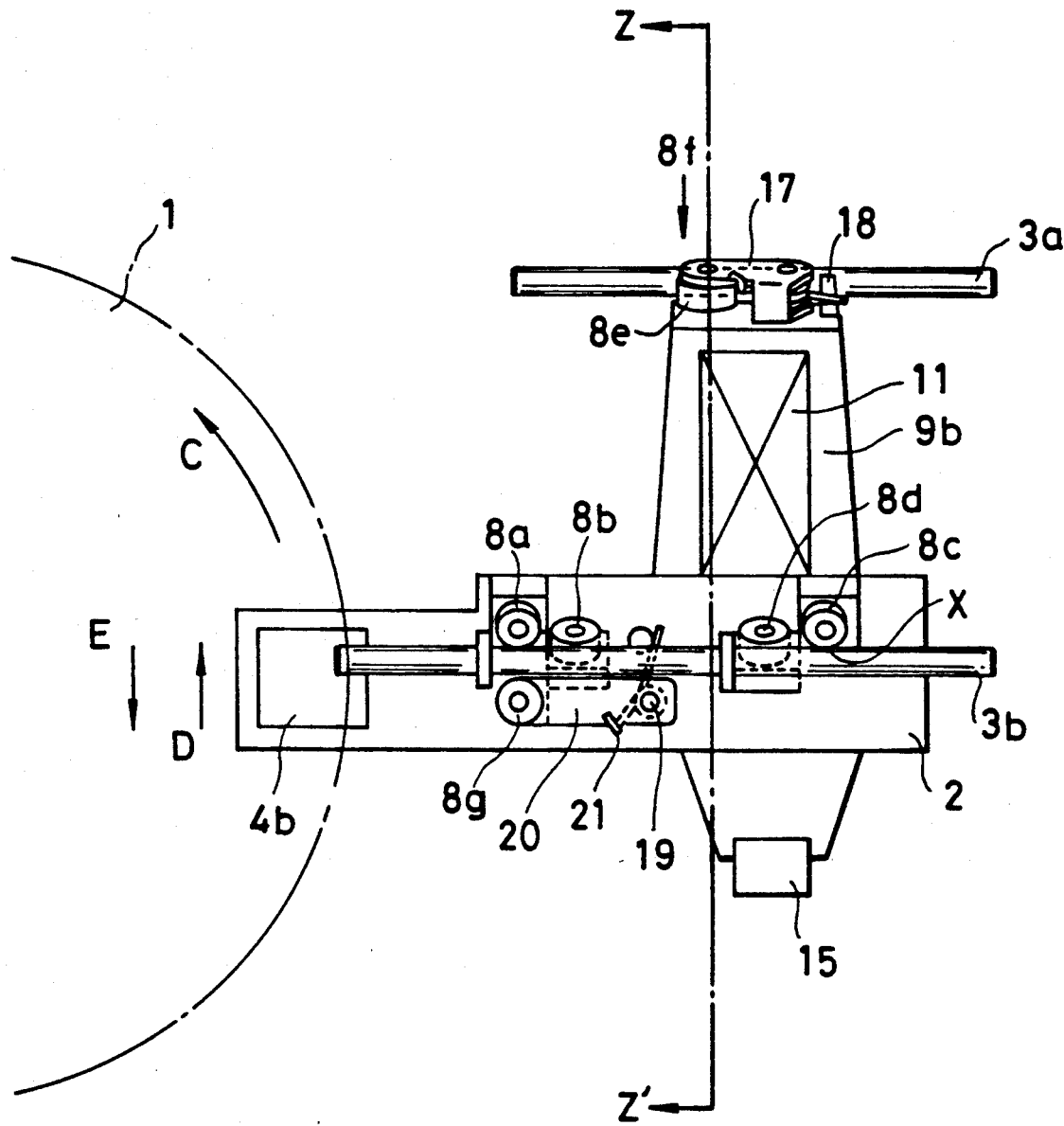
FIG. 1 is a bottom view showing mainly a head displacement mechanism which is one of the most important components of a writing and/or reading apparatus in accordance with the present invention.
Figure 2:
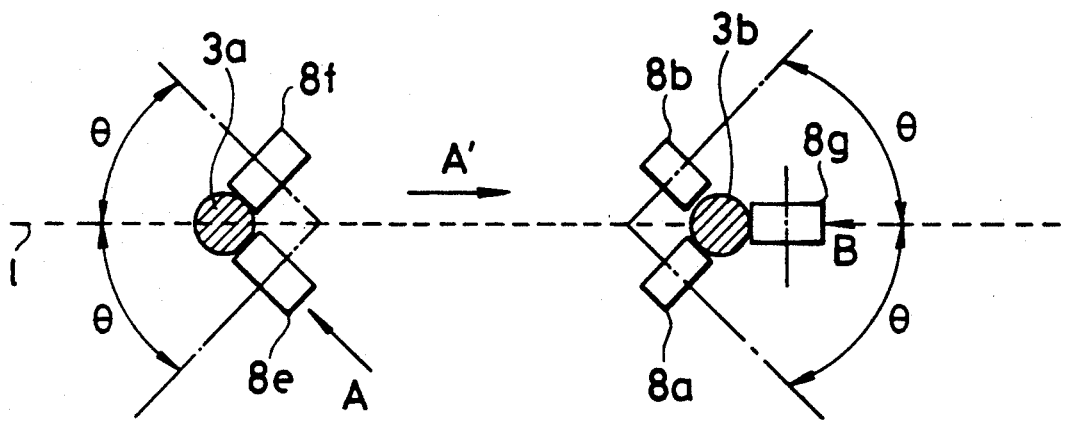
FIG. 2 is a partial sectional view taken along the line Z—Z' of FIG. 1.

Therefore, as shown in FIG. 1, when the magnetic heads 4a and 4b are loaded on the surfaces, respectively, of the disc 1 which is turning in the direction indicated by arrow C, a frictional force is produced by frictional contact between the heads and the surface of the disc 1 and acts in the direction indicated by arrow D, thereby moving the head carriage 2 in the direction D. As a result, the head carriage 2 is rotated in the direction D about the point of contact X between the second guide rod 3b and the roller 8c on which the reaction force of the force imparted to the roller 8e acts. This rotational force causes the head carriage 2 to vibrate. Therefore, tracking error is caused so that accurate data writing and/or reading operation is adversely affected.

In view of the above, the present invention has means for overcoming the above problems. That is, in FIG. 1, a roller bearing 8g is disposed in opposing relationship with the pair of rollers 8a and 8b which are in contact with the second guide rod 3b. The roller 8g is rotatably supported by a swing arm 20 which in turn is swingably pivoted with a pin 19 to the head carriage 2. The swing arm 20 is normally pressed against the second guide rod 3b under the force of a coiled spring 21 within the imaginary plane 1 passing through the axes of the guide rods 3a and 3b. In other words, the swing arm 20 is directed to rotate the head carriage 2 in the direction indicated by arrow E oppositing to the direction D in which acts the rotating force produced by the contact of the head and the surface of the recording disc 1 so that the head carriage 2 is biased in the counterclockwise direction in FIG. 1. As a consequence, the rotating force which rotates the head carriage 2 about the point X on the head carriage 2 in the direction D is canceled so that the deviation of the position of the heads and hence the head carriage 2 and the vibration thereof can be substantially eliminated, whereby the correct read and/or write operation can be accomplished.

In the case of the construction described above, because the deviation of the head carriage 2 from its correct position occurs about the point of X or center at which the roller 8c is made into contact with the second guide rod 3b, from the standpoint of the moment, it is preferable to position the roller 8g spaced apart from the point X as far as possible so that a high degree of stability with low pressure can be ensured.

Next the control of the writing and/or reading apparatus in accordance with the present invention will be described with reference to FIG. 4.

Figure 4:
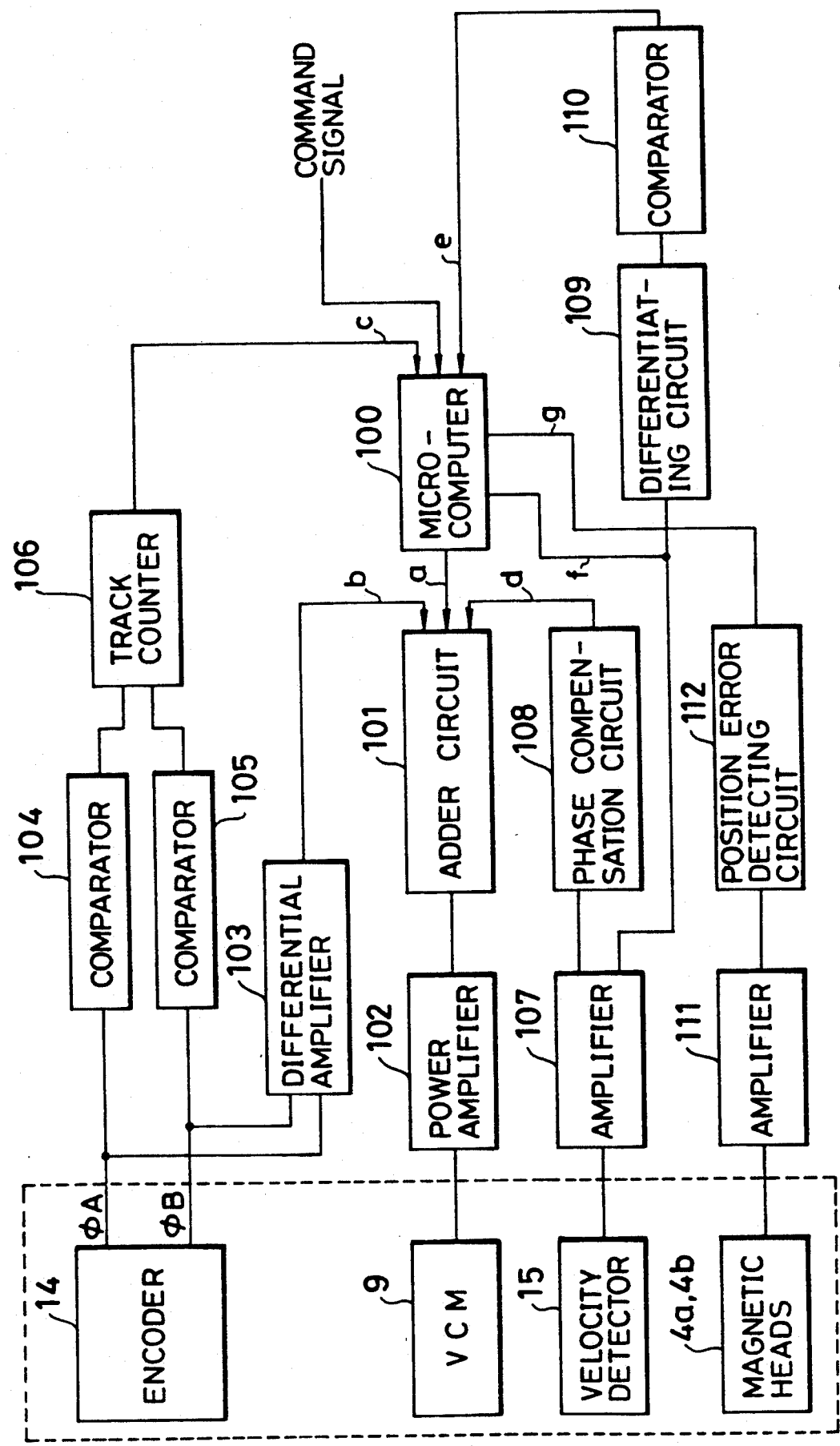
FIG. 4 is a block diagram illustrating a control system of the apparatus in accordance with the present invention.

In FIG. 4, in response to the command signal from an input means such as a keyboard (not shown) or a program stored in a memory in a microcomputer 100, the positions of the first and second magnetic heads 4a and 4b are previously determined so that head displacement command signal a is transmitted through a signal line, an adder circuit 101, and a power amplifier 102 to a voice coil motor (VCM) so that the latter is energized. Then by the coaction between the current flowing through the coil 11 and the magnets 10, the moving member 9b integral with the head carriage 2 is displaced along the first and second guide rods 3a and 3b.

When the head carriage 2 is displaced, because of encoding function of the sensor 13 integral with the head carriage 2 and the linear scale 12 securely attached to the chassis (not shown), information concerning to the displacement of the head carriage 2 such as two signals $\phi$ A and $\phi$ B which are out of phase, is derived from the encoder 14. The output from the encoder 14 is applied to a differential amplifier 103 so that the coarse position of the heads are determined based on the reference point at which the two signal waves cross each other; that is the point at which the phase difference between the two signals becomes zero. Next the output of the differential amplifier 103 is applied as coarse position signal b to the adder circuit 101.

The output signals from the encoder 14 are also applied to comparators 104 and 105, respectively, in which they are compared with predetermined values, respectively. The output signals from the comparators 104 and 105 are applied to a track counter 106 which is an up-down counter capable of counting in the ascending order or in the descending order. The output from the track counter 106 is applied to the microcomputer 100 as signal c representative of the present positions of the magnetic heads, respectively.

Information concerning to the head carriage velocity detected by a velocity detector 15 is amplified by an amplifier 107 and is applied to a phase compensation circuit 18. Output signal d compensated for in the phase compensation circuit 108 is applied to the adder circuit 100 so as to prevent vibration or oscillation due to the phase difference. Output signal f from the amplifier 107 is applied to the microcomputer 100.

The signal representative of the head carriage velocity detected by the velocity detector 15 and amplified by the amplifier 107 is applied to a differentiating circuit 109 and then is compared with a predetermined value in a comparator 110 succeeding to the differentiating circuit 109. When variation of velocity of the head carriage 2 is in excess of the predetermined value determined by the comparator 110, output signal e from the comparator 110 is applied to the microcomputer 100 so that, for instance, the write mode is interrupted to prevent the damage to the data by the impact.

In the case of an apparatus of the type in which servo information is previously recorded on the surface of the disc so that the position of the head can be maintained at a correct position, the magnetic heads 4a and 4b themselves detect the servo information recorded over the surface of the floppy disc 1. The information thus detected is amplified by an amplifier 111 and then is applied to the position error detecting circuit 112. Position error signal g from the position error detecting circuit 112 is applied to the microcomputer 100.

Now in response to coarse position signal b and phase compensated velocity signal d which are directly applied to the adder circuit 101 and present position signal c velocity signal f, impact preventive signal e in the case of the write mode and servo tracking signal g which are applied to the microcomputer 100, the positions of the magnetic heads 4a and 4b integral with the head carriage 2 can be controlled with a high degree of accuracy. For instance, when the number of counts representative of a target position determined by the microcomputer 100 coincides with the number of counts obtained by the track counter 106 as the sensor 13 is displaced, signal a becomes "0". When the output from the differential amplifier 103 is also "0"; that is, the magnetic heads are stopped at the desired track positions corresponding to a predetermined slit position.

Thus, the control of the head positions can be carried out. According to the guide means of the present invention described in detail above, the smooth displacement of the head carriage can be carried out at a high degree of accuracy without causing position error and vibration of the heads.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. In a writing and/or reading device in which at least one head contacts a surface of a rotating recording medium which is rotating in a predetermined direction, a head positioning apparatus comprising:
   a head carriage for mounting said at least one head thereon and which is movable in a radial direction with respect to said rotating recording medium; and
   biasing means for biasing said head carriage in a direction opposite to said predetermined rotating direction of said recording medium to counteract a rotating force exerted on said at least one head which is produced by friction between said at least one head and said recording medium being rotated.

2. A head positioning apparatus as claimed in claim 1, wherein said head carriage is guided by first and second parallel guide rods.

3. A head positioning apparatus as claimed in claim 2, wherein said second guide rod is disposed substantially in the radial direction of said rotating recording medium, a plane including axes of said first and second guide rods being parallel with the surface of said rotating recording medium.

4. A head positioning apparatus as claimed in claim 3, wherein said head carriage is movably supported on one side thereof by said first guide rod and a pair of roller bearings, and movably supported on another side thereof by said second guide rod and two pairs of roller bearings, respectively.

5. A head positioning apparatus as claimed in claim 4, wherein said pair of roller bearings are inclined by predetermined angles, respectively, with respect to the plane including said axes of said first and second guide rods.

6. A head positioning apparatus as claimed in claim 5, wherein said angles are equal to each other.

7. A head positioning apparatus as claimed in claim 5, wherein one of said pair of roller bearings is elastically pressed against said first guide rod.

8. A head positioning apparatus as claimed in claim 7, wherein said biasing means further comprises a further roller bearing which is disposed in opposing relationship with a pair of roller bearings arranged closer to said heads on said second rod.

9. A head positioning apparatus as claimed in claim 8, wherein said further roller bearing is rotatably supported by a swing arm which in turn is swingably disposed parallel to said plane including said axes of said first and second guide rods on said head carriage.

10. A head positioning apparatus as claimed in claim 1, wherein said head carriage has two heads mounted thereon and said two heads sandwich said rotating recording medium therebetween.

11. A writing and/or reading apparatus comprising:
    (a) driving means for rotatably driving a recording medium in a predetermined direction of rotation,
    (b) pick-up means for writing or reading data to or out of said recording medium, said pick-up means contacting said recording medium,
    (c) positioning means for moving said pick-up means in a radial direction with respect to said recording medium so as to change writing or recording positions of said pick-up means, and
    (d) biasing means for urging said pick-up means in a direction opposite said predetermined direction of rotation so as to counteract forces applied to said pick-up means which are caused by friction between said pick-up means and said recording medium being rotated.

12. A writing and/or reading apparatus as claimed in claim 11, wherein said recording medium is a disc, and said driving means includes a spindle driven by a motor to rotate said disc.

13. A writing and/or reading apparatus as claimed in claim 12, wherein said positioning means supports said pick-up means.

14. A writing and/or reading apparatus as claimed in claim 11, wherein said positioning means includes a carriage to which said pick-up means is attached, and said biasing means includes an elastic member for biasing said carriage in a direction opposite said predetermined direction of rotation.

15. A writing and/or reading apparatus as claimed in claim 10, wherein said pickup means comprises two heads which sandwich the rotating recording medium therebetween.

* * * * *